(12) United States Patent
Tanaka et al.

(10) Patent No.: US 6,555,617 B1
(45) Date of Patent: Apr. 29, 2003

(54) COMPOSITION OF CYCLIC ANHYDRIDE MODIFIED POLYVINYL ACETAL AND CURABLE RESIN AND LAMINATED PRODUCTS

(75) Inventors: Toshiyuki Tanaka, Ibaraki (JP); Jun Enda, Ibaraki (JP); Hiroo Katayama, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 248 days.

(21) Appl. No.: 09/628,321

(22) Filed: Jul. 28, 2000

(30) Foreign Application Priority Data

Jul. 29, 1999 (JP) .......................... 11-214935
Jul. 29, 1999 (JP) .......................... 11-214936
Jul. 30, 1999 (JP) .......................... 11-216321

(51) Int. Cl.[7] .................. C08L 29/02; C08L 63/00
(52) U.S. Cl. ................. 525/61; 525/525; 525/454; 524/428; 524/413; 524/461; 524/473.5; 524/474.4; 524/480
(58) Field of Search .................. 525/61, 454, 455, 525/456; 428/413, 461, 473.5, 474.4, 480

(56) References Cited

U.S. PATENT DOCUMENTS 6,254,954 B1 * 7/2001 Bennett
6,270,938 B1 * 8/2001 Gandini

FOREIGN PATENT DOCUMENTS

JP     63-214746     9/1988

* cited by examiner

Primary Examiner—Christopher Henderson
(74) Attorney, Agent, or Firm—Oblon, Spivak, McClelland, Maier & Neustadt, P.C.

(57) ABSTRACT

Disclosed are a modified polyvinyl acetal resin consisting essentially of repeating units represented by the following formula (I), and a modifier for curable resins which comprises the modified polyvinyl acetal resin:

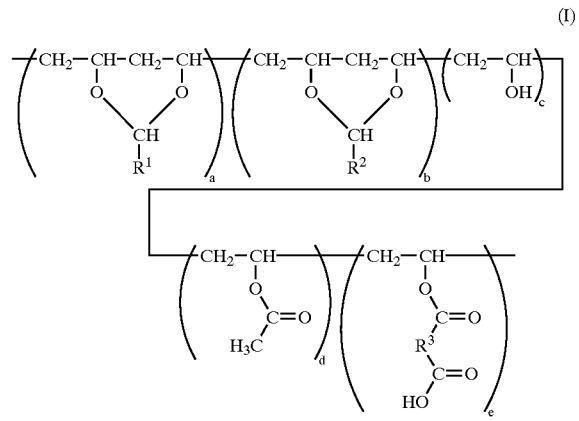

wherein $R^1$ represents an optionally substituted aryl group, an optionally substituted aralkyl group, or an optionally substituted alkenyl group having an optionally substituted aryl group; $R^2$ represents a hydrogen atom or an alkyl group having 1 to 10 carbon atoms; $R^3$ represents an optionally substituted, bivalent hydrocarbon group having 1 to 20 carbon atoms; and a, b, c, d, and e indicate the proportions in mol % of the respective structural units in the formula and satisfy $0<a\leq85$, $0\leq b\leq80$, $0\leq c\leq50$, $0\leq d\leq30$, and $0<e\leq50$; a curable resin composition comprising a curable resin (A), a curing agent (B), and a modified polyvinyl acetal resin (C) consisting essentially of repeating units represented by (I'); and a laminated product comprising a layer of the curable resin composition and/or a cured composition obtained therefrom and a substrate layer:

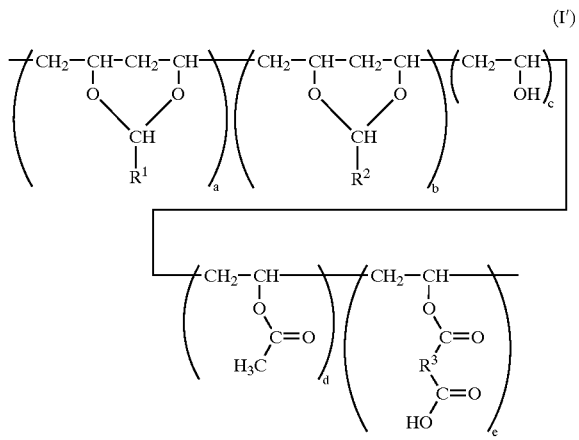

wherein $R^1$, $R^2$, and $R^3$ are as defined above and a, b, c, d, and e, indicating the proportions in mol % of the respective structural units in the formula, satisfy $0\leq a\leq85$, $0\leq\leq80$, $0\leq c\leq50$, $0\leq d\leq30$, $0<e\leq50$, and $a+b\neq0$.

9 Claims, No Drawings

COMPOSITION OF CYCLIC ANHYDRIDE MODIFIED POLYVINYL ACETAL AND CURABLE RESIN AND LAMINATED PRODUCTS

FIELD OF THE INVENTION

The present invention relates to a modified polyvinyl acetal resin, a modifier for curable resins, a curable resin composition, and laminated products.

The modified polyvinyl acetal resin of the present invention is excellent not only in dielectric characteristics but in compatibility with various solvents and thermosetting resins and in adhesiveness. The resin is hence useful as an electrical insulating material.

The modifier for curable resins of the invention comprises the specific modified polyvinyl acetal resin. By adding this modifier to a curable resin, a curable resin composition can be provided which has excellent adhesiveness and is suitable for use as an electrical insulating material, etc.

The curable resin composition of the invention comprises a curable resin/curing agent combination compounded with a specific modified polyvinyl acetal resin. The composition has greatly improved film-forming properties and can hence be applied to various substrates to form a stable, homogeneous film. Since the film combines excellent adhesiveness to substrates and flexibility, the composition is especially suitable for use as an adhesive.

The laminated products of the invention comprise a substrate layer and a layer of a curable resin composition containing a specific modified polyvinyl acetal resin and/or of a cured composition obtained by curing the curable resin composition. Since the layer of the curable resin composition has greatly improved film-forming properties, it can be applied to various substrates to form a stable, homogeneous film, which combines excellent adhesiveness to the substrates and flexibility. The laminated products are hence used especially as adhesives having excellent flexibility and high adhesiveness.

BACKGROUND OF THE INVENTION

Curable resins, which mostly comprise low-molecular weight compounds, are applied in the form of a solution in a solvent or in a melt form to substrates and then cured under given conditions to thereby exhibit adhesiveness to the substrates. As a result, satisfactory laminated products can be obtained. Furthermore, by superposing an adherend on the surface of the thus-applied solution or melt of an uncured curable resin and then curing the resin, a three-layer laminated product composed of the substrate, an adhesive layer, and the adherend can be obtained in which the resin exhibits adhesiveness to the adherend and which also is satisfactory. Besides being used in such applications, curable resins are extensively used as matrix resins in an application in which fibers or an inorganic or organic filler is mixed with a solution or melt of the curable resin and the mixture is cured alone to obtain a satisfactory composite, or in an application in which the mixture is likewise applied to a substrate and united with an adherend.

In the case of using a solid curable resin, a solution prepared by dissolving the resin in a solvent is applied to a substrate and the solvent which has become unnecessary is removed thereafter to form an exceedingly hard film. However, because the resin has a low-molecular weight, the film is highly brittle and is apt to readily peel off the substrate or develop cracks. In the case of using a liquid curable resin, a solution thereof is prepared and applied in the same manner and the solvent is then removed. In this case, however, there are many problems, for example, that the resin, upon solvent removal, returns to the original liquid state and, as a result, it becomes difficult to maintain an even film thickness, making it difficult to exhibit even and stable adhesive strength, and that the resin surface has tackiness and this necessitates significantly complicated operations. Because of these drawbacks, a technique is used in which the curing reaction is caused to proceed to some degree to thereby increase the molecular weight of the resin, i.e., bring the resin into the so-called B-stage. Although this technique is effective in improving evenness of film thickness, it is difficult to control the B-stage and to stably maintain the B-stage over long. In addition, as the molecular weight increases, the ability to wet an adherend decreases, resulting in reduced adhesion strength. Consequently, this technique is not a satisfactory technique for improvements.

In contrast, an attempt has been made to maintain applicability and film properties without increasing the molecular weight of a curable resin as a whole, by adding thereto a rubber, thermoplastic resin, etc. However, curable resins do not always have satisfactory compatibility with rubbers or thermoplastic resins. There are cases where even though the composition has been homogenized with a solvent, it undergoes phase separation upon solvent volatilization, or undergoes phase separation upon curing reactions after solvent vaporization and coagulates at the composition/substrate interface or, conversely, at the composition/air interface, resulting in an insufficient effect of improvement.

One measure in overcoming the problem described above is proposed, e.g., in JP-A-5-186667 (the term "JP-A" as used herein means an "unexamined published Japanese patent application") which is an epoxy resin composition comprising an epoxy compound, a curing agent, and a polyvinyl acetal resin having a peculiar structure highly compatible with the epoxy compound/curing agent combination.

However, this epoxy resin composition was found to have drawbacks that application of the composition to a substrate results in cissing on the substrate surface and that curing the applied composition significantly reduces the flexibility of the substrate.

On the other hand, various insulating materials are known for use in the field of electronics industry as overcoat materials, interlayer dielectric materials, or the like in semiconductors, ICs, hybrid ICs, wiring circuit boards, display devices, display parts, etc. Examples thereof include passivation films, soldering resists, plating resists, interlayer dielectric materials, and moisture-proof protective films. These insulating materials also have come to be desired to have higher performances and higher reliability with the recent trend in electronic parts toward miniaturization, weight reduction, density increase, and speed increase.

In order for an insulating material to have a smaller dielectric loss, even in a slight degree, it should have a lower dielectric constant and a smaller dielectric loss tangent.

As such materials are used thermosetting resins such as phenolic resins, epoxy resins, and polyimide resins and thermoplastic resins such as fluororesins and polyolefin resins.

However, these thermosetting resins have had difficulties in attaining higher speeds and higher reliability because they usually have a dielectric constant as high as 4.0 or higher and a dielectric loss tangent as large as 0.01 or above.

The thermoplastic resins, on the other hand, have had problems, for example, that they have poor workability, poor adhesiveness, and insufficient reliability.

SUMMARY OF THE INVENTION

Objects of the invention are (i) to provide a modified polyvinyl acetal resin excellent in dielectric characteristics and in compatibility with thermosetting resins and adhesiveness, (ii) to provide a modifier for curable resins which has excellent compatibility with curable resins and which, when added to a curable resin, improves the dielectric characteristics, film-forming properties, and flexibility of the resin, (iii) to provide a curable resin composition in which the modified polyvinyl acetal resin has excellent compatibility with the curable resin and which is excellent in film-forming properties and flexibility and adhesiveness, and (iv) to provide a laminated product in which a stable and even film having excellent adhesiveness to the substrate can be formed and which has flexibility.

The present inventors made intensive investigations in view of the circumstances described above. As a result, they have found that (i) a modified polyvinyl acetal resin having a specific structure is excellent not only in dielectric characteristics but in compatibility with various solvents and thermosetting resins and in adhesiveness, (ii) addition of this modified polyvinyl acetal resin to a curable resin improves the dielectric characteristics and film-forming properties of the curable resin, (iii) by incorporating a specific modified polyvinyl acetal resin to a combination of a curable resin and a curing agent, a cured resin is obtained which is excellent in film-forming properties, flexibility, and adhesiveness, and (iv) a laminated product comprising a substrate and an adhesive layer comprising a curable resin composition containing the modified polyvinyl acetal resin is excellent in substrate wettability and adhesiveness after cure while retaining the intact flexibility of the substrate. The present invention has been completed based on these findings.

The essential aspects of the present invention reside in a modified polyvinyl acetal resin consisting essentially of repeating units represented by the following formula (I):

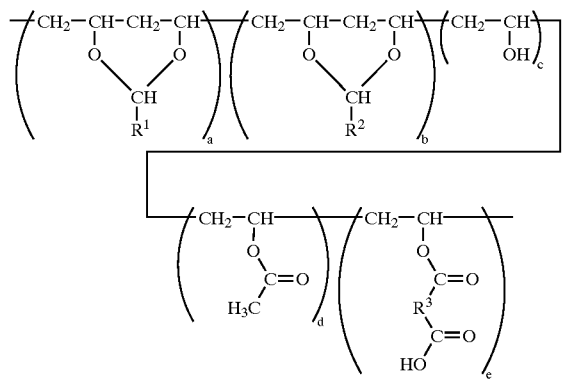

(I)

wherein $R^1$ represents an optionally substituted aryl group, an optionally substituted aralkyl group, or an optionally substituted alkenyl group having an optionally substituted aryl group; $R^2$ represents a hydrogen atom or an alkyl group having 1 to 10 carbon atoms; $R^3$ represents an optionally substituted, bivalent hydrocarbon group having 1 to 20 carbon atoms; and a, b, c, d, and e indicate the proportions in mol % of the respective structural units in the formula and satisfy $0 < a \leq 85$, $0 \leq b \leq 80$, $0 \leq c \leq 50$, $0 \leq d \leq 30$, and $0 < e \leq 50$.

In a preferred embodiment of the invention, a modifier for curable resins is provided which comprises the modified polyvinyl acetal resin.

The invention further provides a curable resin composition comprising a curable resin (A) and a curing agent (B) and further containing a modified polyvinyl acetal resin (C) consisting essentially of repeating units represented by the following formula (I'), and furthermore provides a laminated product comprising a layer of the curable resin composition and a substrate layer:

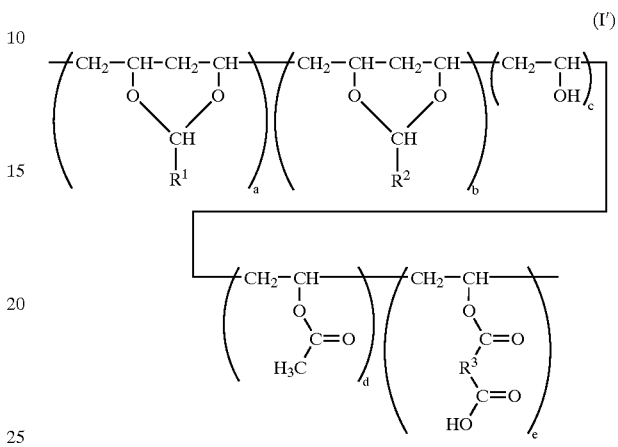

(I')

wherein $R^1$ represents an optionally substituted aryl group, an optionally substituted aralkyl group, or an optionally substituted alkenyl group having an optionally substituted aryl group; $R^2$ represents a hydrogen atom or an alkyl group having 1 to 10 carbon atoms; $R^3$ represents an optionally substituted, bivalent hydrocarbon group having 1 to 20 carbon atoms; and a, b, c, d, and e indicate the proportions in mol % of the respective structural units in the formula and satisfy $0 \leq a \leq 85$, $0 \leq b \leq 80$, $0 \leq c \leq 50$, $0 \leq d \leq 30$, $0 < e \leq 50$, and $a + b \neq 0$.

In this specification, formulae (I) and (I') are structural formulae, each of which merely indicates the proportions of constituent elements of the resin, and are not intended to specify an arrangement of these elements (e.g., a block arrangement). The modified polyvinyl acetal resin represented by formula (I) may contain other constituent elements as long as these optional elements do not defeat the objects of the invention.

DETAILED DESCRIPTION OF THE INVENTION

The invention will be explained below in detail.

Modified Polyvinyl Acetal Resin

The characteristic feature of the invention resides in a modified polyvinyl acetal resin consisting essentially of repeating units represented by formula (I).

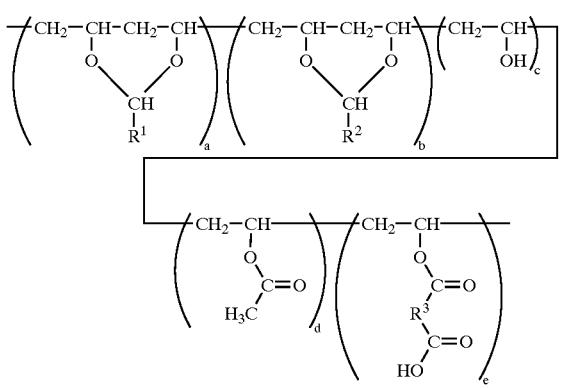

(I)

In formula (I), $R^1$ represents an optionally substituted aryl group, an optionally substituted aralkyl group, or an optionally substituted alkenyl group having an optionally substituted aryl group; $R^2$ represents a hydrogen atom or an alkyl group having 1 to 10 carbon atoms; and $R^3$ represents an optionally substituted, bivalent hydrocarbon group having 1 to 20 carbon atoms. Furthermore, a, b, c, d, and e indicate the proportions in mol % of the respective structural units in the formula and satisfy $0<a \leq 85$, $0 \leq b \leq 80$, $0 \leq c \leq 50$, $0 \leq d \leq 30$, and $0<e \leq 50$.

In the case where $R^1$ in formula (I) is an optionally substituted aryl group, it preferably has 6 to 12 carbon atoms. Examples thereof include phenyl, tolyl, xylyl, ethylphenyl, methoxyphenyl, aminophenyl, chlorophenyl, and naphthyl.

When $R^1$ is an optionally substituted aryl group, the resin is improved in $T_g$ and is effective in improving heat resistance.

In the case where $R^1$ is an optionally substituted aralkyl group, it preferably has 7 to 12 carbon atoms. Examples thereof include benzyl, phenylethyl, and phenylpropyl.

When $R^1$ is an optionally substituted aralkyl group, the resin is especially effective in reducing dielectric loss tangent.

In the case where $R^1$ is an optionally substituted alkenyl group having an optionally substituted aryl group, it preferably has 8 to 12 carbon atoms. Examples thereof include phenylvinyl and phenylpropenyl.

$R^1$ is preferably an optionally substituted aryl group or an optionally substituted aralkyl group.

Examples of the substituents of these aryl, aralkyl, and alkenyl groups include alkyl groups such as methyl and ethyl, alkoxy groups such as methoxy, amino, alkylamino groups, acylamino groups, carboxyl, carboxylic ester groups, hydroxyl group, and halogen atoms such as chloro, besides the substituents given above.

In the case where $R^2$ is an alkyl group having 1 to 10, preferably 1 to 8 carbon atoms, examples thereof include methyl, ethyl, propyl, butyl, and hexyl.

Preferred examples of $R^2$ include methyl and propyl.

$R^3$ is an optionally substituted bivalent hydrocarbon group having 1 to 20, preferably 1 to 12 carbon atoms. Examples thereof include methylene, ethylene, trimethylene, butylene, cyclohexylene, methylcyclohexylene, carboxycyclohexylene, norbornylene, vinylene, cyclohexenylene, phenylene, and naphthylene.

Preferred examples of $R^3$ include ethylene, phenylene, and vinylene.

With respect to the proportions (mol %) of the structural units, that of a is $0<a \leq 85$, preferably $10 \leq a \leq 80$; that of b is $0 \leq b \leq 80$, preferably $0 \leq b \leq 70$; that of c is $0 \leq c<50$, preferably $0 \leq c \leq 45$; that of d is $0 \leq d \leq 30$, preferably $0 \leq d \leq 15$; and that of e is $0<e \leq 50$, preferably $1 \leq e \leq 50$.

In case where a is too small, the resin has an increased dielectric constant and a lowered $T_g$ and is hence less effective in improvements. In case where c is too large, the resin has enhanced hydrophilicity to show impaired performances due to moisture absorption, has an increased dielectric constant, and is hence less effective in improvements.

In case where d is too large, the resin has too small a proportion of acetal groups incorporated through acetalization and hence shows insufficient performances. In case where e is too small, the resin has reduced adhesiveness and is less effective in improvements. In case where e is too large, the resin has enhanced hydrophilicity to show impaired performances due to moisture absorption, has an increased dielectric constant, and is hence less effective in improvements.

In this specification, formula (I) is a structural formula which merely indicates the proportions of constituent elements of the resin and is not intended to specify an arrangement of these elements (e.g., a block arrangement). The modified polyvinyl acetal resin represented by formula (I) may contain other constituent elements as long as these optional elements do not defeat the objects of the invention.

The modified polyvinyl acetal resin represented by formula (I) generally has an acid value of from 5 to 150 mg-KOH/g as determined through the titration of a solution of 1.0 g of the resin in 200 ml of DMF with 0.5 mol/l ethanolic potassium hydroxide solution using automatic titrator GT-05, manufactured by Mitsubishi Chemical Corp.

The modified polyvinyl acetal resin of the invention is suitable for use in electrical insulating materials, and is useful in anisotropic conductive films, interlayer dielectrics, or electronic members for high-speed communication apparatus, e.g., routers. On the other hand, the modified polyvinyl acetal resin is applicable to other fields such as, e.g., adhesives, coating materials, linings, fiber-reinforced composites, and constructional materials so as to take advantage of properties thereof such as adhesiveness and film-forming properties.

Since the modified polyvinyl acetal resin is highly compatible, it can be used in combination with a curable or plastic resin, e.g., an epoxy resin, acrylic resin, or urethane resin.

Inorganic or organic fibers and organic or inorganic fillers may be added to the composition as long as this addition does not reduce the performances of the composition.

Process for Producing Modified Polyvinyl Acetal Resin

Processes for producing the modified polyvinyl acetal resin of the invention are not particularly limited. However, a preferred process, for example, comprises acetalizing a polyvinyl alcohol and then reacting the resultant acetalization product with an acid anhydride to esterify part of the hydroxyl groups remaining in the acetalization product with the acid anhydride and thereby modify the acetalization product.

A commercial acetalization product can be used as a starting material and modified with an acid anhydride.

The acetalization of a polyvinyl alcohol with an aldehyde can be conducted, for example, in accordance with the method described in JP-A-5-140217. An outline of this method is as follows.

The acetalization of a polyvinyl alcohol is accomplished by reacting the polyvinyl alcohol with an aldehyde represented by formula (II) and/or an aldehyde represented by formula (III) with the aid of an acid catalyst usually in a solvent.

It is preferred in this case that the water yielded by the reaction be distilled off as an azeotrope with the solvent.

The polyvinyl alcohol used as a starting material is not particularly limited, but preferably has a degree of polymerization of from 30 to 3,000. Usable examples of commercial polyvinyl alcohol products include GOHSENOL NL05, manufactured by The Nippon Synthetic Chemical Industry Co., Ltd.

The aldehydes used as starting materials are respectively represented by formulae (II) and (III):

wherein $R^1$ and $R^2$ are the same as in formula (I).

Examples of the aldehyde represented by formula (II) include benzaldehyde and derivatives thereof, naphthaldehydes and derivatives thereof, cinnamaldehyde and derivatives thereof, and alkylaldehydes having a phenyl or naphthyl group. In these aldehydes, the benzene and naphthalene rings may have one or more substituents selected from alkyl groups, alkoxy groups, amino, alkylamino groups, acylamino groups, carboxyl, carboxylic ester groups, hydroxyl group, and halogen atoms.

Specific examples of these aldehydes include benzaldehyde, 1-naphthaldehyde, phenylacetaldehyde, phenylpropionaldehyde, o-tolualdehyde, p-tolualdehyde, o-anisaldehyde, m-anisaldehyde, p-anisaldehyde, p-ethylbenzaldehyde, o-chlorobenzaldehyde, p-chlorobenzaldehyde, and cinnamaldehyde. Preferred of these are benzaldehyde, phenylacetaldehyde, o-tolualdehyde, and p-tolualdehyde.

The aldehyde represented by formula (II) has an aromatic ring, and incorporation of aromatic rings derived from this aldehyde enables the modified polyvinyl acetal resin to have a reduced dielectric constant, a reduced dielectric loss tangent, and an improved $T_g$. It can be further thought that since this modified polyvinyl acetal resin has improved compatibility with other resins, it gives, when blended with another resin, a resin composition having improved viscosity characteristics and giving a cured composition having improved impact resistance.

Examples of the aldehyde represented by formula (III) include formaldehyde, acetaldehyde, propionaldehyde, butyraldehyde, caproic aldehyde, caprylaldehyde, and capric aldehyde. Preferred of these are formaldehyde, acetaldehyde, and butyraldehyde.

In the modified polyvinyl acetal resin, a+b is preferably in the range of from 30 to 80 mol %.

Further, of the structural units represented by formula (I) of the modified polyvinyl acetal resin, it is preferred that the proportion of the structural acetal units having $R^1$ to the sum of the structural acetal units having $R^1$ and the structural acetal units having $R^2$, a/a+b, is 10% or more. Too small proportions thereof result in an increased dielectric constant and a lessened effect in improvements.

As the acid catalyst is used, for example, an inorganic acid such as hydrochloric acid, sulfuric acid, or phosphoric acid, acetic acid, or p-toluenesulfonic acid. Preferred of these are hydrochloric acid, sulfuric acid, and p-toluenesulfonic acid. The use amount of the catalyst is generally from 0.005 to 0.2 mol per mol of the aldehyde(s).

The solvent is not particularly limited as long as it forms an azeotrope with water and readily separates from the water through liquid/liquid separation. Preferred examples thereof include aromatic hydrocarbons such as benzene, toluene, and xylene. Especially preferred is toluene.

The use amount of the solvent is generally from 100 to 2,000 parts by weight, preferably from 200 to 1,000 parts by weight, per 100 parts by weight of the polyvinyl alcohol used as a starting material.

The reaction temperature is generally from 20 to 90° C., preferably from 40 to 70° C. The reaction time is generally from 2 to 10 hours.

The reaction may be conducted either batchwise or continuously.

After completion of the reaction, the target polyvinyl acetal resin can be recovered from the reaction mixture in an ordinary way. For example, a poor solvent for the target polyvinyl acetal resin, such as methanol, is added to the reaction mixture to precipitate the resin, after the reaction mixture is neutralized and filtered after completion of the reaction. The polyvinyl acetal resin thus precipitated is recovered. According to need, the resin precipitated can be purified by repeating an operation in which the resin recovered is redissolved in a good solvent such as toluene and then precipitated again with the poor solvent.

Subsequently, the acetalization product obtained is modified with an acid anhydride. This modification can be conducted by using any known method of esterifying an alcohol. More specifically, the modification is conducted by reacting the polyvinyl acetal resin thus obtained with an acid anhydride represented by formula (IV).

The polyvinyl acetal resin obtained by the step described above is used as a feed material. However, when a commercial product of the resin is available, it may be used. The acid anhydride as the other feed material is one represented by formula (IV):

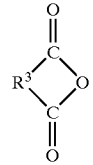

(IV)

wherein $R^3$ is the same as in formula (I)

Examples of the acid anhydride represented by formula (IV) include phthalic anhydride, naphthalene-1,2-dicarboxylic anhydride, succinic anhydride, maleic anhydride, glutaric anhydride, trimellitic anhydride, cyclohexane-1,2-dicarboxylic anhydride, 4-cyclohexene-1, 2-dicarboxylic anhydride, 4-methylcyclohexane-1,2-dicarboxylic anhydride, and norbornane-2,3-dicarboxylic anhydride. Preferred of these are phthalic anhydride, succinic anhydride, and maleic anhydride. It is thought that the addition of this acid anhydride improves compatibility with other resins and adhesiveness. Consequently, e in formula (I) is preferably 1 mol % or larger.

This reaction may be conducted without using a catalyst. However, by using a catalyst, the reaction can be carried out under milder conditions. Examples of the catalyst include tertiary amines such as pyridine, lutidine, 4-dimethylaminopyridine, triethylamine, diisopropylethylamine, and N-ethylpiperidine, bases such as sodium acetate, and acid catalysts such as sulfuric acid, hydrochloric acid, $ZnCl_2$, and $HClO_4$. Preferred of these are tertiary amines. The use amount of the catalyst is generally from 0.001 to 1 mol per mol of the acid anhydride.

The reaction can be conducted without using a solvent, i.e., while keeping the resin in a bulked state. In the case of using a solvent, the solvent may be a hydrocarbon, ketone, ester, ether, amide, or another solvent. Specific examples thereof include N,N-dimethylformamide, toluene, MEK, and MIBK. The use amount of the solvent is generally from 100 to 2,000 parts by weight, preferably from 200 to 1,000 parts by weight, per 100 parts by weight of the polyvinyl acetal resin as a feed material.

The reaction temperature is generally from 30 to 200° C., preferably from 50 to 180° C. The reaction time is generally from 1 to 15 hours.

The reaction may be conducted either batchwise or continuously.

After completion of the reaction, the target modified polyvinyl acetal resin can be recovered from the reaction mixture in an ordinary way. For example, a poor solvent for the target modified polyvinyl acetal resin, such as methanol, is added to the reaction mixture to precipitate the resin, after the reaction mixture is neutralized and filtered after completion of the reaction. The modified polyvinyl acetal resin thus precipitated is recovered. According to need, the resin precipitated can be purified by repeating an operation in which the resin recovered is redissolved in a good solvent such as acetone and then precipitated again with the poor solvent.

Modifier for Curable Resin

The modifier for curable resins of the invention is characterized by comprising the modified polyvinyl acetal resin consisting essentially of repeating units represented by formula (I). The modifier may contain other ingredients as long as these optional ingredients do not impair the performances of the modifier. For example, a solvent such as, e.g., methyl ethyl ketone, may be added for the purpose of mixing time reduction.

The use amount of the modifier for curable resins varies depending on purposes of the use thereof. However, too small addition amounts in terms of the modified polyvinyl acetal resin ingredient result in the reduced ability to form a film on substrates. On the other hand, in case where the addition amount thereof is too large, the resultant composition has an increased viscosity and hence the solvent volatilizes insufficiently and partly remains in the film. The residual solvent may be causative of film blistering or peeling, depending on the subsequent heat history. Consequently, the modified polyvinyl acetal resin ingredient represented by formula (I) is added in an amount of generally from 0.1 to 200 parts by weight, preferably from 0.5 to 180 parts by weight, per 100 parts by weight of the curable resin.

Curable Resin Composition

The curable resin composition of the invention, which comprises a curable resin (A) and a curing agent (B), is characterized by further containing a modified polyvinyl acetal resin (C) consisting essentially of repeating units represented by formula (I').

Ingredient (C) used in the invention is a modified polyvinyl acetal resin consisting essentially of repeating units represented by formula (I').

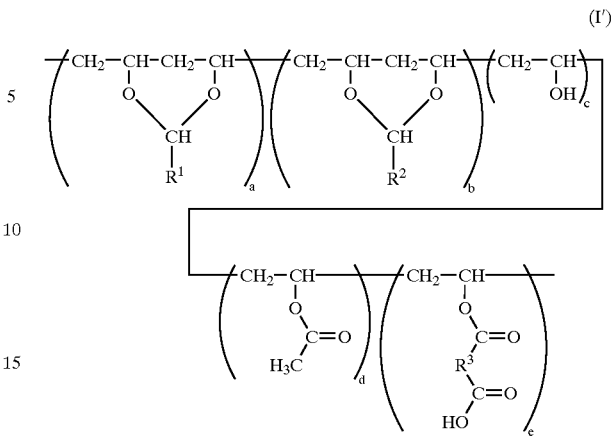

In formula (I'), $R^1$ represents an optionally substituted aryl group, an optionally substituted aralkyl group, or an optionally substituted alkenyl group having an optionally substituted aryl group; $R^2$ represents a hydrogen atom or an alkyl group having 1 to 10 carbon atoms; and $R^3$ represents an optionally substituted, bivalent hydrocarbon group having 1 to 20 carbon atoms. Furthermore, a, b, c, d, and e indicate the proportions in mol % of the respective structural units in the formula and satisfy $0 \leq a \leq 85$, $0 \leq b \leq 80$, $0 \leq c \leq 50$, $0 \leq d \leq 30$, $0 < e \leq 50$, and $a+b \neq 0$.

In the case where $R^1$ in formula (I') is an optionally substituted aryl group, it preferably has 6 to 12 carbon atoms. Examples thereof include phenyl, tolyl, xylyl, ethylphenyl, methoxypheny, aminophenyl, chlorophenyl, and naphthyl.

When $R^1$ is an optionally substituted aryl group, the resin is improved in $T_g$ and is effective in improving heat resistance.

In the case where $R^1$ is an optionally substituted aralkyl group, it preferably has 7 to 12 carbon atoms. Examples thereof include benzyl, phenylethyl, and phenylpropyl.

When $R^1$ is an optionally substituted aralkyl group, the resin is especially effective in reducing dielectric loss tangent.

In the case where $R^1$ is an optionally substituted alkenyl group having an optionally substituted aryl group, it preferably has 8 to 12 carbon atoms. Examples thereof include phenylvinyl and phenylpropenyl.

$R^1$ is preferably an optionally substituted aryl group or an optionally substituted aralkyl group.

Examples of the substituents of these aryl, aralkyl, and alkenyl groups include alkyl groups such as methyl and ethyl, alkoxy groups such as methoxy, amino, alkylamino groups, acylamino groups, carboxyl, carboxylic ester groups, hydroxyl group, and halogen atoms such as chloro, besides the substituents given above.

In the case where $R^2$ is an alkyl group having 1 to 10, preferably 1 to 8 carbon atoms, examples thereof include methyl, ethyl, propyl, butyl, and hexyl.

Preferred examples of $R^2$ include methyl and propyl.

$R^3$ is an optionally substituted bivalent hydrocarbon group having 1 to 20, preferably 1 to 12 carbon atoms. Examples thereof include methylene, ethylene, trimethylene, butylene, cyclohexylene, methylcyclohexylene, carboxycyclohexylene, norbornylene, vinylene, cyclohexenylene, phenylene, and naphthylene.

Preferred examples of $R^3$ include ethylene, phenylene, and vinylene.

With respect to the proportions (mol %) of the structural units, that of a is $0 \leq a \leq 85$, preferably $0 \leq a \leq 80$; that of b is $0 \leq b \leq 80$, preferably $0 \leq b \leq 70$; the sum of a and b is not equal to 0; that of c is $0 \leq c \leq 50$, preferably $0 \leq c \leq 45$; that of d is $0 \leq d \leq 30$, preferably $0 \leq d \leq 15$; and that of e is $0 \leq e < 50$, preferably $1 \leq e \leq 50$.

A resin with smaller proportion of the structural acetal units having $R^1$, i.e. with smaller a, tends to have an increased dielectric constant and a lowered $T_g$. In case where c is too large, the resin has enhanced hydrophilicity to show impaired performances due to moisture absorption, has an increased dielectric constant, and is hence less effective in improvements.

In case where d is too large, the resin has too small a proportion of acetal groups incorporated through acetalization and hence shows insufficient performances. In case where e is too small, the resin has reduced adhesiveness and is less effective in improvements. In case where e is too large, the resin has enhanced hydrophilicity to show impaired performances due to moisture absorption, has an increased dielectric constant, and is hence less effective in improvements.

In this specification, formula (I') is a structural formula which merely indicates the proportions of constituent elements of the resin and is not intended to specify an arrangement of these elements (e.g., a block arrangement). The modified polyvinyl acetal resin represented by formula (I') may contain other constituent elements as long as these optional elements do not defeat the objects of the invention.

The use amount of the modified polyvinyl acetal resin of ingredient (C) varies depending on purposes of the use thereof. However, too small addition amounts of the modified polyvinyl acetal resin result in the reduced ability to form a film on substrates. On the other hand, in case where the addition amount thereof is too large, the resultant composition has an increased viscosity and hence the solvent volatilizes insufficiently and partly remains in the film. The residual solvent may be causative of film blistering or peeling, depending on the subsequent heat history. Consequently, the incorporation amount of ingredient (C) is generally from 0.1 to 200 parts by weight, preferably from 0.5 to 180 parts by weight, per 100 parts by weight of the curable resin.

Provided as a preferred embodiment of the curable resin composition of the invention is a curable resin composition which comprises a curable resin (A), a curing agent (B), and a modified polyvinyl acetal resin (C) consisting essentially of repeating units represented by formula (I) wherein a, indicating the proportion of one kind of repeating units in the resin (C), satisfies $0 < a \leq 85$. When the modified polyvinyl acetal resin is added to a combination of a curable resin and a curing agent, the curable resin composition obtained by mixing these ingredients has improved dielectric characteristics irrespective of the kind(s) of the curable resin and/or the curing agent.

The modified polyvinyl acetal resin has, as an essential component, substituents represented by $R^1$ which are optionally substituted aryl groups, optionally substituted aralkyl groups, or optionally substituted alkenyl groups having an optionally substituted aryl group. An especially preferred range of the amount of these substituents is such that $10 \leq a \leq 80$. A resin with smaller proportion of the structural acetal units having $R^1$, i.e. with smaller a, tends to have an increased dielectric constant and a lowered $T_g$.

Examples of the curable resin of ingredient (A) include epoxy resins, acrylic compounds, isocyanate compounds, and melamine compounds. Preferred of these are epoxy resins from the standpoint of compatibility with the modified polyvinyl acetal resin of ingredient (C) and/or of the adhesiveness of the resin composition.

As the epoxy resins can be used various epoxy resins such as, e.g., bisphenol epoxyes, phenolic novolak epoxyes, cresol novolak epoxyes, glycidylamine epoxyes, alicyclicepoxyes, and glycidyl ester epoxyes. Preferred usable examples of bisphenol A epoxyes include "Epikote" 828, 1001, 1004, and 1009 (manufactured by Yuka Shell Epoxy K.K.), "Araldite" GY250 and "Araldite" 6071, 6072, 6097, and 6099 (manufactured by Ciba-Geigy Corp.), and "Dow Epoxy" DER 331, 661, 664, and 669 (manufactured by The Dow Chemical Co.).

Preferred usable examples of the phenolic novolak epoxyes include "Epikote" 15 and 154 (manufactured by Yuka Shell Epoxy K.K.), "Araldite" EPN 1138 and 1139 (manufactured by Ciba-Geigy Corp.), and "Dow Epoxy" DEN 431, 438, and 485 (manufactured by The Dow Chemical Co.). Preferred usable examples of the cresol novolak epoxyes include "Araldite" ECN 1235, 1273, and 1299 (manufactured by Ciba-Geigy Corp.) and "EOCN" 102 (manufactured by Nippon Kayaku Co., Ltd.). Preferred usable examples of the glycidylamine epoxyes include "Araldite" MY 720 (manufactured by Ciba-Geigy Corp.) and "Sumiepoxy" ELM 100, 120, and 434 (manufactured by Sumitomo Chemical Co., Ltd.).

Preferred usable examples of the alicyclic epoxyes include "Araldite" CY 175, 177, and 179 (manufactured by Ciba-Geigy Corp.). Preferred usable examples of the glycidyl ester epoxyes include "Epikote" 190P and 191P (manufactured by Yuka Shell Epoxy K. K.) and "Araldite" CY 184 and 192 (manufactured by Ciba-Geigy Corp.). Other usable epoxy resins include bisphenol F epoxyes such as "Araldite" XPY 306 (manufactured by Ciba-Geigy Corp.) and brominated epoxyes such as "Epikote" 5050 and 5051 (manufactured by Yuka Shell Epoxy K. K.).

As the acrylic compounds can be used various acrylic compounds such as, e.g., acrylic or methacrylic esters of mono-or polyhydric alcohols, such as alkyl acrylates, alkyl methacrylates, and alkylene dimethacrylates, hydroxyl-containing acrylic or methacrylic esters such as hydroxyalkyl acrylates and hydroxyalkyl methacrylates, amino-containing acrylic or methacrylic esters such as aminoalkyl acrylates and aminoalkyl methacrylates, acrylic acid, and methacrylic acid. Specific examples of these acrylic compounds include methyl acrylate, ethyl acrylate, propyl acrylate, butyl acrylate, isopropyl acrylate, isobutyl acrylate, t-butyl acrylate, 2-ethylhexyl acrylate, styryl acrylate, methyl methacrylate, ethyl methacrylate, propyl methacrylate, butyl methacrylate, isopropyl methacrylate, isobutyl methacrylate, t-butyl methacrylate, 2-ethylhexyl methacrylate, styryl methacrylate, ethylene dimethacrylate, glycidyl methacrylate, 2-hydroxyethyl acrylate, 4-hydroxybutyl acrylate, 2-hydroxyethyl methacrylate, 2-aminoethyl acrylate, 2-aminoethyl methacrylate, and acrylic or methacrylic esters produced by causing any of the epoxy resins enumerated above to add acrylic or methacrylic acid. Basically, any acrylic compound may be used as long as one or more acrylic or methacrylic groups are present in the chemical molecular structure thereof.

Usable examples of the isocyanate compounds include toluene 2,4-diisocyanate, p-phenylene diisocyanate, and hexamethylene diisocyanate.

As the curing agent of ingredient (B) to be used in the invention is selected a curing agent which enables the curable resin of ingredient (A) to cure sufficiently.

In the case where ingredient (A) is an epoxy resin, usable examples of ingredient (B) include aromatic amines such as m-phenylenediamine, 4,4'-methylenedianiline, and diaminodiphenyl sulfone, aliphatic polyamines such as diethylenetriamine, triethylenetetramine, tetraethylenepentamine, and diethylaminopropylamine, imidazole compounds such as 2-ethyl-4-methylimidazole, 1-cyanoethyl-2-ethyl-4-methylimidazole, 1-aminoethyl-2-methylimidazole, 1-(cyanoethylaminoethyl)-2-methylimidazole, and 1-benzyl-2-methylimidazole, acid anhydrides such as maleic anhydride, phthalic anhydride, hexahydrophthalic anhydride, and methylnadic anhydride, phenol compounds, dicyandiamide, and $BF_3$/amine complexes such as $BF_3$/monoethylamine complex and BF3/piperidine complex.

These curing agents may be used alone or in combination of two or more thereof. A curing accelerator can be suitably used in combination with the curing agent.

Further, the curing agent is generally used in such an amount that the number of active hydrogen atoms contained in, e.g., the amino, imino or phenolic hydroxyl groups derived from the curing agent or the number of acid anhydride groups of the curing agent is nearly equivalent to the number of epoxy groups derived from the epoxy resin.

In the case where ingredient (A) is an acrylic compound, usable examples of ingredient (B) include peroxides such as benzoyl peroxide and cumene hydroperoxide and diazo compounds such as azobisisobutyronitrile.

Another preferred embodiment of the curable resin composition of the invention is the curable resin composition described above which comprises a curable resin (A), a curing agent (B), and a modified polyvinyl acetal resin (C) consisting essentially of repeating units represented by formula (I') and in which the curable resin (A) is an epoxy resin. In this case, when the modified polyvinyl acetal resin (C) is used in combination with an epoxy resin as the curable resin (A), the curable resin composition obtained by mixing these ingredients is improved in film-forming properties, flexibility, and adhesiveness irrespective of whether or not the modified polyvinyl acetal resin (C) has, in the structure thereof, groups represented by $R^1$, i.e., optionally substituted aryl groups, optionally substituted aralkyl groups, or optionally substituted alkenyl groups having an optionally substituted aryl group.

As the epoxy resin in the embodiment shown above can be used various epoxy resins such as, e.g., bisphenol epoxyes, phenolic novolak epoxyes, cresol novolak epoxyes, glycidylamine epoxyes, alicyclic epoxyes, and glycidyl ester epoxyes. Preferred examples of these types of epoxyes include the epoxy compounds enumerated above.

On the other hand, ingredient (B) is, for example, an aromatic amine, alicyclic polyamine, imidazole compound, acid anhydride, phenol compound, dicyandiamide, or $BF_3$/amine complex, such as those enumerated above.

These curing agents may be used alone or in combination of two or more thereof. A curing accelerator can be suitably used in combination with the curing agent.

Further, the curing agent is generally used in such an amount that the number of active hydrogen atoms contained in, e.g., the amino, imino or phenolic hydroxyl groups derived from the curing agent or the number of acid anhydride groups of the curing agent is nearly equivalent to the number of epoxy groups derived from the epoxy resin.

The resin composition of the invention, which contains the modified polyvinyl acetal resin, is suitable for use in electrical insulating materials, and is useful in anisotropic conductive films, interlayer dielectrics, or electronic members for high-speed communication apparatus, e.g., routers. On the other hand, the composition is applicable to other fields such as, e.g., adhesives, coating materials, linings, fiber-reinforced composites, and constructional materials so as to take advantage of properties thereof such as adhesiveness and film-forming properties.

Since the composition is highly compatible, it can be used in combination with a curable or plastic resin, e.g., an epoxy resin, acrylic resin, or urethane resin.

Inorganic or organic fibers and organic or inorganic fillers may be added to the composition as long as this addition does not reduce the performances of the composition.

Methods for curing the curable resin composition of the invention are not particularly limited as long as the curable resin can be sufficiently cured with the curing agent by the action of heat, light, ultraviolet, etc. When ingredient (A) is an epoxy resin, heating is usually employed. Curing conditions cannot be specified unconditionally because they vary depending on the kinds of the epoxy resin and curing agent. However, in the case of a combination of a bisphenol A epoxy resin and an imidazole curing agent, the curing temperature is generally from 10 to 200° C. and the curing time is generally from 1 to 7 hours.

The curable resin composition of the invention may be applied to a substrate by the so-called wet process after having been mixed using a solvent. Alternatively, the composition may be applied to a substrate by the so-called hot-melt process after having been mixed without using a solvent optionally with heating. The substrate may be a plastic, metal, ceramic, or another substrate. Examples of the plastic include polyesters, polyamides, and polyimides. Examples of the metal include aluminum, copper, iron, stainless steel, and silicon. Examples of the ceramic include glasses and alumina. Examples of the polyimides among these materials include Kapton (trade name; manufactured by Toray Industries, Inc.) and Upilex (trade name; manufactured by Ube Industries, Ltd.). Of these, Upilex is especially preferred as the substrate.

Although the curable resin composition of the invention is suitable for use as an adhesive, inorganic or organic fibers or organic or inorganic fillers may be added thereto as long as this addition does not reduce the performances of the composition. The composition is applicable to other fields such as, e.g., coating materials, linings, electrical insulating materials, and constructional materials so as to take advantage of the adhesiveness and film-forming properties thereof.

The curable resin composition of the invention may be applied to a substrate by the so-called wet process after having been mixed using a solvent, or may be applied to a substrate by the so-called hot-melt process after having been mixed without using a solvent optionally with heating. Inorganic or organic fibers or organic or inorganic fillers may be added to this composition.

The substrate may be a plastic, metal, ceramic, or another substrate. Examples of the plastic include polyesters, polyamides, and polyimides. Examples of the metal include aluminum, copper, iron, stainless steel, and silicon. Examples of the ceramic include glasses and alumina. Examples of the polyimides among these materials include Kapton (trade name; manufacturedbyToray Industries, Inc.) andUpilex (trade name; manufactured by Ube Industries, Ltd.). Of these, Upilex is especially preferred as the substrate.

Laminated Product

The laminated product of the invention comprises a substrate layer and a layer of the curable resin composition containing a modified polyvinyl acetal resin represented by formula (I') and/or a cured composition obtained by curing the composition.

Examples of processes for producing the laminated product include a method comprising coating a substrate with either a solution of the curable resin composition in a solvent or a melt of the composition and then curing the applied composition under given conditions. A three-layer laminated product composed of a substrate, an adhesive layer, and an adherend can be obtained by superposing the adherend on the surface of the thus-applied solution or melt of the uncured curable resin composition and then curing the composition. Furthermore, when fibers or an inorganic or organic filler is mixed with a solution or melt of the curable resin composition and the mixture is likewise applied to a substrate, then a laminated product having a cured composition united with the adherend can be obtained.

Since the laminated product of the invention has as a component thereof a layer of the curable resin composition and/or of a cured composition obtained by curing the composition and this layer has improved film-forming properties, there is a wide choice of substrates. Furthermore, since the curable resin composition can form a stable and homogeneous film having excellent adhesiveness to substrates and flexibility, a highly stable laminated product having especially high flexibility is obtained.

EXAMPLES

The invention will be explained below in more detail by reference to Examples and Comparative Examples. However, the invention should not be construed as being limited to these Examples unless the invention departs from the spirit thereof.

The hydroxyl value of each polyvinyl acetal resin obtained was determined in accordance with JIS K6728. The acid value of each modified polyvinyl acetal resin was determined by titrating a solution of 1.0 g of the modified polyvinyl acetal resin in 200 ml of DMF with 0.5 mol/l ethanolic potassium hydroxide solution using automatic titrator GT-05, manufactured by Mitsubishi Chemical Corp.

Production Example 1

Production of Polyvinyl Acetal Resin SA

Poly (vinyl acetal) resin SA was produced in the following manner. Into a 3-liter glass flask were introduced 100 g of a polyvinyl alcohol (trade name, GOHSENOL NL05; manufactured by The Nippon Synthetic Chemical Industry Co., Ltd.), 195 g of phenylacetaldehyde, 33 g of butyraldehyde, 584 g of toluene, and 13.2 g of 35% hydrochloric acid. The contents were stirred slowly. The flask was set on an oil bath and the contents were heated to 58° C. over 1.5 hours, held at 58° C. for 5 hours, and then allowed to cool. At the time when the contents had cooled to 35° C., 535.6 g of a methanol solution containing 18.26 g of sodium acetate dissolved therein was gradually added to neutralize the reaction mixture. The white precipitate thus yielded was removed by filtration through a 5C filter paper.

All the residual contents were introduced into a flask containing 2,380 g of methanol, and the resultant mixture was stirred at 40° C. for 30 minutes. The liquid was wholly discarded, and 756 g of toluene was added to the precipitate to dissolve the same. Thereafter, 2,380 g of methanol was added thereto to cause precipitation again. This purification step was conducted twice. The liquid was wholly discarded, and the precipitate was air-dried and then transferred to an aluminum vat. This vat was placed in a vacuum dryer and the precipitate was dried at a degree of vacuum of 5 Torr and a temperature of 50° C. for 12 hours to obtain 165 g of polyvinyl acetal resin SA.

Values of δ for an NMR spectrum are shown below. $^1$H-NMR (300 MHz, DMSO-d6) δ7.1–7.4: (s, aromatic H), δ5.0–4.1: (m, hydroxyl H), (methine H in the structure represented by the following formula (1)) and (methine H in the structure represented by the following formula (2)), δ4.1–3.6: (m, methine H in the structure represented by the following formula (3)), δ3.0–2.6: (s, methylene H in the structure represented by the following formula (4)), δ2.2–1.1: (m, methylene H other than in the methylene represented by the following formula (4)), δ1.0–0.9: (s, methyl H).

The resin had a hydroxyl value of 99 mg-KOH/g.

(1)

(2)

(3)

(4)

(5)

Example 1

Production of Modified Polyvinyl Acetal Resin PA1

Into a 3,000-ml glass flask were introduced 100 g of the polyvinyl acetal resin SA obtained in Production Example 1, 70.5 g of phthalic anhydride, 1,000 ml of N,N-dimethylformamide, and 5.8 g of 4-dimethylaminopyridine. The contents were stirred slowly. The flask was set on an oil bath and the contents were heated to 100° C. over 30 minutes, held at 100° C. for 4 hours, and then allowed to cool. This reaction mixture was filtered through a No. 4 filter paper. All the residual contents were gradually introduced into a beaker containing 5,500 ml of methanol, and the resultant mixture was stirred for 30 minutes. As a result, a yellowish white precipitate generated. The liquid was wholly discarded, and 300 ml of acetone was added to the precipitate to dissolve the same. Thereafter, 2,500 ml of methanol was added thereto to cause precipitation, and the liquid was discarded again. The residual precipitate was air-dried and then transferred to an aluminum vat. This vat was placed in a vacuum dryer and the precipitate was dried at a degree of vacuum of 5 Torr and a temperature of 80° C. for 12 hours to obtain 140 g of modified polyvinyl acetal resin PA1.

This resin had an acid value of 63 mg-KOH/g.

Thus, a polymer represented by formula (I) wherein $R^1=CH_2C_6H_5$, $R^2=C_3H_7$, $R^3=-C_6H_4-$, a=46, b=28, c=6, d=1, and e=19 was obtained.

Example 2

Production of Modified Polyvinyl Acetal Resin PA2

Into a 3,000-ml glass flask were introduced 100 g of the polyvinyl acetal resin SA obtained in Production Example 1, 47.7 g of succinic anhydride, 1,000 ml of N,N-dimethylformamide, and 5.8 g of 4-dimethylaminopyridine. The contents were stirred slowly. The flask was set on an oil bath and the contents were heated to 100° C. over 30 minutes, held at 100° C. for 4 hours, and then allowed to cool. To this reaction mixture was added 800 g of methanol. All the contents were gradually introduced into a vessel containing 15 liter of water, and the resultant mixture was stirred for 30 minutes. As a result, a yellowish white precipitate generated. The liquid was wholly discarded, and a mixed solvent consisting of 800 g of methanol and 15 liter of water was added to the precipitate to wash the same. The liquid was discarded again. The residual precipitate was air-dried and then transferred to an aluminum vat. This vat was placed in a vacuum dryer and the precipitate was dried at a degree of vacuum of 5 Torr and a temperature of 80° C. for 12 hours to obtain 104 g of modified polyvinyl acetal resin PA2.

This resin had an acid value of 55 mg-KOH/g.

Thus, a polymer represented by formula (I) wherein $R^1=CH_2C_6H_5$, $R^2=C_3H_7$, $R^3=$—$CH_2CH_2$—, a=46, b=28, c=10, d=1, and e=15 was obtained.

Production Example 2

Production of Modified Polyvinyl Acetal Resin PB1

Into a 3,000-ml glass flask were introduced 20 g of a polyvinyl butyral resin (trade name, S-LEC B BL-S; manufactured by Sekisui Chemical Co., Ltd.; hereinafter sometimes referred to as "polyvinyl acetal resin SB"), 14.1 g of phthalic anhydride, 200 ml of N,N-dimethylformamide, and 1.16 g of 4-dimethylaminopyridine. The contents were stirred slowly. The flask was set on an oil bath and the contents were heated to 100° C. over 30 minutes, held at 100° C. for 4 hours, and then allowed to cool. All the contents were gradually introduced into a beaker containing 200 g of methanol, and 3 liter of water was further added. The resultant mixture was stirred for 30 minutes. As a result, a yellowish white precipitate generated. The liquid was wholly discarded, and the precipitate was added to a mixed solvent consisting of 200 g of methanol and 2 liter of water to wash the precipitate. The liquid was discarded again. The residual precipitate was air-dried and then transferred to an aluminum vat. This vat was placed in a vacuum dryer and the precipitate was dried at a degree of vacuum of 5 Torr and a temperature of 80° C. for 12 hours to obtain 24.1 g of modified polyvinyl acetal resin PB1.

This resin had an acid value of 87 mg-KOH/g.

Thus, a polymer represented by formula (I) wherein $R^2=C_3H_7$, $R^3=$—$C_6H_4$—, a=0, b=60, c=16, d=3, and e=21 was obtained.

Production Example 3

Production of Modified Polyvinyl Acetal Resin PB2

Into a 1,000-ml glass flask were introduced 80 g of a polyvinyl butyral resin (trade name, S-LEC B BL-S; manufactured by Sekisui Chemical Co., Ltd.), 7.1 g of succinic anhydride, and 200 g of N,N-dimethylformamide. The contents were stirred slowly. The flask was set on an oil bath and the contents were heated to 60° C. over 30 minutes to completely dissolve the same. Subsequently, the solution was heated to 100° C. over 30 minutes, held at 100° C. for 4 hours, and then allowed to cool. All the contents were gradually dropped into a beaker containing 1,600 g of water.

The resultant particulate precipitate was taken out by filtration, washed with 160 g of water, and then transferred to a 3-liter flask. Into this flask were introduced 1,600 g of water and 160 g of methanol. The contents were stirred at 45° C. for 1 hour.

The precipitate was taken out by filtration, washed with 160 g of water, and then transferred to a stainless-steel vat. This precipitate was dried in a hot-air drying oven at 60° C. for 42 hours and then further dried in a vacuum dryer at a degree of vacuum of 5 Torr and a temperature of 70° C. for 119 hours to obtain 83 g of modified polyvinyl acetal resin PB2.

This resin had an acid value of 40 mg-KOH/g.

Thus, a polymer represented by formula (I) wherein $R^2=C_3H_7$, $R^3=$—$CH_2CH_2$—, a=0, b=60, c=29, d=3, and e=8 was obtained.

The compositions of the modified polyvinyl acetal resins PA1, PA2, PB1, and PB2 respectively obtained in Examples 1 and 2 and Production Examples 2 and 3 are shown in Table 1 together with the composition of the polyvinyl acetal resin SA obtained in Production Example 1 and that of commercial polyvinyl butyral SB.

TABLE 1

Structures of modified polyvinyl acetal resins and unmodified polyvinyl acetal resins

| | | Composition of resin | | | | |
|---|---|---|---|---|---|---|
| | Resin | a | b | c | d | e |
| Example 1 | PA1 | 46 | 28 | 6 | 1 | 19 |
| Example 2 | PA2 | 46 | 28 | 10 | 1 | 15 |
| Production Example 2 | PB1 | 0 | 60 | 16 | 3 | 21 |
| Production Example 3 | PB2 | 0 | 60 | 29 | 3 | 8 |
| Production Example 1 | SA | 46 | 28 | 25 | 1 | 0 |
| Polyvinyl butyral | SB | 0 | 60 | 37 | 3 | 0 |

Symbols a, b, c, d, and e indicate the proportions (mol %) of the respective structural units in formula (I).

$R^1=CH_2C_6H_5$, $R^2=C_3H_7$, $R^3=$—$C_6H_4$— (Example 1 and Production Example 2) or —$CH_2CH_2$— (Example 2 and Production Example 3).

Production Example 4

Production of Polyvinyl Acetal Resin SC

Poly (vinyl acetal) resin SC was produced in the following manner. Into a 3-liter glass flask were introduced 200 g of a polyvinyl alcohol (trade name, GOHSENOL NL05; manufactured by The Nippon Synthetic Chemical Industry Co., Ltd.), 336 g of benzaldehyde, 66 g of butyraldehyde, 1,163 g of toluene, and 10.56 g of 35% hydrochloric acid. The contents were stirred slowly. The flask was set on an oil bath and the contents were heated to 75° C. over 0.75 hour and then held at 75° C. for 2 hours. Thereafter, 31.68 g of 35% hydrochloric acid was added thereto, and this mixture was held for 5 hours and then allowed to cool. At the time when the mixture had cooled to 35° C., 600 g of a methanol solution containing 52.7 g of sodium acetate dissolved therein was gradually added to neutralize the reaction mixture. This reaction mixture was poured into 3,500 g of methanol with stirring, and the resultant precipitate was dissolved in 1,200 g of toluene. A 1,120 g portion of this solution was filtered through a 5C filter paper. The filtrate was poured into 2,100 g of methanol with stirring to obtain 438.4 g of a precipitate. This precipitate was transferred to a 3-liter separable flask, and 350 g of toluene was added thereto to dissolve the precipitate with heating at 60° C. To this solution was gradually added 1,200 g of methanol to cause precipitation. This purification step was conducted twice. The liquid was discarded, and the precipitate was air-dried, transferred to a vacuum dryer, and dried therein at a degree of vacuum of 5 Torr and a temperature of 80° C. for 36 hours to obtain 213.2 g of polyvinyl acetal resin SC.

Values of δ for an NMR spectrum are shown below.
$^1$H-NMR (300 MHz, DMSO-d6)

δ7.5–7.2: (d, aromatic H), δ5.9–5.4: (d, methine H in the structure represented by formula (5)), δ5.0–3.6: (m, hydroxyl H), (s, methine H in the structure represented by formula (1)), and (d, methine H in the structure represented by formula (3)), δ2.2–1.1: (m, methylene H), δ1.0–0.8: (s, methyl H).

The resin had a hydroxyl value of 96 mg-KOH/g.

Example 3

Production of Modified Polyvinyl Acetal Resin PC1

Into a 3,000-ml glass flask were introduced 200 g of the polyvinyl acetal resin SC obtained in Production Example 4, 85.2 g of succinic anhydride, and 500 g of N,N-dimethylformamide. The contents were stirred slowly. The flask was set on an oil bath and the contents were held at 80° C. for 1.5 hours to completely dissolve the same. Thereafter, 11.6 g of 4-dimethylaminopyridine was added to the solution, and this mixture was held at 100° C. for 4 hours and then allowed to cool. Thereto was added 200 g of N,N-dimethylformamide. All the contents were gradually dropped into a beaker containing 8,000 ml of water. The solid obtained was taken out by filtration, placed in a beaker containing 2,100 g of methanol, allowed to stand for 10 hours, and then taken out by filtration. This operation was conducted twice. The solid recovered was dissolved in 250 g of acetone, and 1,200 g of methanol was added thereto. As a result, a brown precipitate was obtained. The liquid was discarded, and 250 g of acetone was added to the precipitate to dissolve the same. Thereafter, 400 g of methanol was added thereto to obtain a precipitate, and the liquid was discarded. The residual precipitate was added to 1,100 g of water, and this mixture was treated with a mixer for pulverization. The pulverized precipitate was taken out by filtration, transferred to a vacuum dryer, and dried therein at a degree of vacuum of 5 Torr and a temperature of 80° C. for 55 hours to obtain 209 g of modified polyvinyl acetal resin PC1.

This resin had an acid value of 67.8 mg-KOH/g.

Thus, a polymer represented by formula (I) wherein $R^1=C_6H_5$, $R^2=C_3H_7$, $R^3=$—$CH_2CH_2$—, a=41, b=35, c=5, d=1, and e=18 was obtained.

Production Example 5

Production of Polyvinyl Acetal Resin SD

Polyvinyl acetal resin SD was produced in the following manner. Into a 1-liter glass flask were introduced 40 g of a polyvinyl alcohol (trade name, GOHSENOL NL05; manufactured by The Nippon Synthetic Chemical Industry Co., Ltd.), 99 g of 1-naphthaldehyde, 13 g of butyraldehyde, 234 g of toluene, and 8.5 g of 35% hydrochloric acid. The contents were stirred slowly. The flask was set on an oil bath and the contents were heated to 75° C. over 0.75 hour, held at 75° C. for 5 hours, and then allowed to cool. At the time when the contents had cooled to 40° C., 250 g of methanol was added thereto. As a result, a brown precipitate generated. The liquid was discarded, and 100 g of toluene was added to the precipitate. This mixture was heated to 60° C. with stirring.

Fifty grams of a methanol solution containing 10.5 g of sodium acetate dissolved therein was gradually added to the mixture to neutralize the same. To this reaction mixture was added 200 g of methanol with stirring. The precipitate obtained was dissolved in 120 g of toluene, and 300 g of methanol was added to the solution to cause precipitation again. This operation was conducted three times.

The liquid was discarded, and the precipitate was air-dried, transferred to a vacuum dryer, and dried therein at a degree of vacuum of 5 Torr and a temperature of 80° C. for 72 hours to obtain 35 g of polyvinyl acetal resin SD.

Values of δ for an NMR spectrum are shown below.
$^1$H-NMR (300 MHz, CDCl$_3$)

δ7.1–8.3: (m, aromatic H), δ5.9–6.5: (m, methine H in the structure represented by formula (5)), δ3.4–5.3: (m, hydroxyl H), (methine H in the structure represented by formula (1)), and (methine H in the structure represented by formula (3)), δ1.0–2.7: (m, methylene H), δ0.6–1.0: (s, methyl H).

The resin had a hydroxyl value of 155.6 mg-KOH/g.

Example 4

Production of Modified Polyvinyl Acetal Resin PD1

Into a 500-ml glass flask were introduced 20 g of the polyvinyl acetal resin SD obtained in Production Example 5, 8.5 g of succinic anhydride, and 50 g of N,N-dimethylformamide. The contents were stirred slowly. The flask was set on an oil bath and the contents were held at 80° C. for 1.5 hours. Thereafter, this mixture was held at 100° C. for 4 hours and then allowed to cool. Thereto was added 50 g of N,N-dimethylformamide. All the contents were gradually dropped into a beaker containing 1400 ml of water. The solid obtained was taken out by filtration and dissolved in 100 g of methyl ethyl ketone, and 200 g of methanol was added thereto. As a result, a brown precipitate was obtained. The liquid was discarded, and 150 g of methyl ethyl ketone and 100 g of toluene were added to the precipitate to dissolve the same. This mixture was filtered through a 5C filter paper. Thereafter, 200 g of methanol was added thereto to obtain a precipitate, and the liquid was discarded. The precipitate was transferred to a vacuum dryer, and dried therein at a degree of vacuum of 5 Torr and a temperature of 80° C. for 55 hours to obtain 14.5 g of modified polyvinyl acetal resin PD1.

This resin had an acid value of 70.1 mg-KOH/g.

Thus, a polymer represented by formula (I) wherein $R^1=C_{10}$, $H_7$, $R^2=C_3H_7$, $R^3=$—$CH_2CH_2$—, a=35, b=27, c=18, d=1, and e=19 was obtained.

Production Example 6

Production of Polyvinyl Acetal Resin SE

Poly (vinyl acetal) resin SE was produced in the following manner. Into a 1-liter glass flask were introduced 40 g of a polyvinyl alcohol (trade name, GOHSENOL NL05; manufactured by The Nippon Synthetic Chemical Industry Co., Ltd.), 85 g of phenylpropionaldehyde, 13 g of butyraldehyde, 234 g of toluene, and 8.45 g of 35% hydrochloric acid. The contents were stirred slowly. The flask was set on an oil bath and the contents were heated to 75° C. over 0.75 hour, held at 75° C. for 5 hours, and then allowed to cool. At the time when the contents had cooled to 35° C., 150 g of a methanol solution containing 10.6 g of sodium acetate dissolved therein was gradually added to neutralize the reaction mixture. This reaction mixture was filtered through a 5C filter paper.

Into the filtrate was poured 800 g of methanol with stirring. As a result, a light-yellow precipitate generated. The liquid was discarded, and the precipitate was dissolved in 300 g of toluene. To this solution was added 800 g of methanol to cause precipitation again. This operation was conducted three times.

The liquid was discarded, and the precipitate was air-dried, transferred to a vacuum dryer, and dried therein at a degree of vacuum of 5 Torr and a temperature of 80° C. for 72 hours to obtain 31.9 g of polyvinyl acetal resin SE.

Values of δ for an NMR spectrum are shown below.
$^1$H-NMR (300 MHz, DMSO-d6)
δ7.0–7.6: (d, aromatic H), δ7.5–5.0: (m, hydroxyl H), (methine H in the structure represented by formula (1)), (methine H in the structure represented by formula (2)), and (methine H in the structure represented by formula (3)), δ1.2–3.0: (m, methylene H in the structure represented by formula (4)), (m, methylene H other than in the methylene represented by formula (4)), δ0.8–1.1: (s, methyl H).

The resin had a hydroxyl value of 72.8 mg-KOH/g.

Example 5

Production of Modified Polyvinyl Acetal Resin PE1

Into a 500-ml glass flask were introduced 20 g of the polyvinyl acetal resin SE obtained in Production Example 6, 8.5 g of succinic anhydride, and 50 g of N,N-dimethylformamide. The contents were stirred slowly. The flask was set on an oil bath and the contents were held at 80° C. for 1.5 hours to completely dissolve the same. Thereafter, 1.2 g of 4-dimethylaminopyridine was added thereto, and this mixture was held at 100° C. for 4 hours and then allowed to cool. Thereto was added 50 g of N,N-dimethylformamide. Thereafter, 200 g of methanol was added thereto to obtain a precipitate, and the liquid was discarded. The precipitate was dissolved in 50 g of toluene, and 200 g of methanol was added to this solution to cause precipitation again, and the liquid was discarded. This operation was conducted three times. The precipitate was transferred to a vacuum dryer, and dried therein at a degree of vacuum of 5 Torr and a temperature of 80° C. for 55 hours to obtain 21.1 g of modified polyvinyl acetal resin PE1.

This resin had an acid value of 42.3 mg-KOH/g.

Thus, a polymer represented by formula (I) wherein $R^1=C_2H_4Ph$, $R^2=C_3H_7$, $R^3=-CH_2CH_2-$, a=59, b=19, c=8, d=1, and e=13

The compositions of the modified polyvinyl acetal resins PC1, PD1, and PE1 respectively obtained in Examples 3 to 5 are shown in Table 2 together with the compositions of the polyvinyl acetal resins SC, SD, and SE respectively obtained in Production Examples 4 to 6.

TABLE 2

Structures of modified polyvinyl acetal resins and unmodified polyvinyl acetal resins

| | | Composition of resin | | | | |
|---|---|---|---|---|---|---|
| | Resin | a | b | c | d | e |
| Example 3 | PC1 | 41 | 35 | 5 | 1 | 18 |
| Example 4 | PD1 | 35 | 27 | 18 | 1 | 19 |
| Example 5 | PE1 | 59 | 19 | 8 | 1 | 13 |

TABLE 2-continued

Structures of modified polyvinyl acetal resins and unmodified polyvinyl acetal resins

| | | Composition of resin | | | | |
|---|---|---|---|---|---|---|
| | Resin | a | b | c | d | e |
| Production Example 4 | SC | 41 | 35 | 23 | 1 | 0 |
| Production Example 5 | SD | 35 | 27 | 37 | 1 | 0 |
| Production Example 6 | SE | 59 | 19 | 21 | 1 | 0 |

Symbols a, b, c, d, and e indicate the proportions (mol %) of the respective structural units in formula (I).

$R^1=C_6H_5$ (Example 3 (PC1)), Production Example 4 (SC)), $C_{10}H_7$ (Example 4 (PD1), Production Example 5 (SD)), or $C_2H_4Ph$ (Example 5 (PE1), Production Example 6 (SE)), $R^2=C_3H_7$, $R^3=-CH_2CH_2-$.

Example 6

In 24.0 g of methyl ethyl ketone was dissolved 6.0 g of the modified polyvinyl acetal resin PA1. This solution was applied to a polyethylene sheet with a 10-mil applicator, and the coating was dried at 60° C. for 1 hour. Subsequently, the coated sheet was placed in a vacuum dryer and dried therein at a degree of vacuum of 5 Torr and a temperature of 60° C. for 12 hours. The polyethylene sheet was peeled off to obtain a filmy resin. This resin was examined for dielectric constant and dielectric loss tangent at 10 MHz using an impedance analyzer (HP4291A, manufactured by HEWLETT-PACKARD Co.).

Example 7

The same experiment as in Example 6 was conducted, except that modified polyvinyl acetal resin PA2 was used in place of PA1.

Example 8

The same experiment as in Example 6 was conducted, except that modified polyvinyl acetal resin PC1 was used in place of PA1.

Example 9

The same experiment as in Example 6 was conducted, except that modified polyvinyl acetal resin PD1 was used in place of PA1.

Example 10

The same experiment as in Example 6 was conducted, except that modified polyvinyl acetal resin PE1 was used in place of PA1.

Comparative Example 1

The same experiment as in Example 6 was conducted, except that modified polyvinyl acetal resin PB1 was used in place of PA1.

Comparative Example 2

The same experiment as in Example 6 was conducted, except that polyvinyl butyral resin SB (trade name, S-LEC B BL-S; manufactured by Sekisui Chemical Co., Ltd.) was used in place of modified polyvinyl acetal resin PA1.

Comparative Example 3

The same experiment as in Example 6 was conducted, except that modified polyvinyl acetal resin PB2 was used in place of PA1.

In Table 3 are shown the results obtained in Examples 6 to 10 and Comparative Examples 1 to 3.

The results show that resins PB1 and PB2, corresponding to a=0, and polyvinyl butyral resin SB had larger dielectric loss tangents than PA1, PA2, PC1, PD1 and PE1, used in Examples 6 to 10.

TABLE 3

Dielectric constants and dielectric loss tangents of modified polyvinyl acetal resins

| | Resin | ε (10 MHZ) | tan δ (×10E-3) | Film thickness |
|---|---|---|---|---|
| Example 6 | PA1 | 2.0 | 5.8 | 25 |
| Example 7 | PA2 | 2.1 | 5.8 | 26 |
| Example 8 | PC1 | 2.1 | 9.0 | 28 |
| Example 9 | PD1 | 2.0 | 6.4 | 25 |
| Example 10 | PE1 | 2.0 | 5.4 | 26 |
| Comparative Example 1 | PB1 | 2.1 | 9.6 | 26 |
| Comparative Example 3 | PB2 | 2.1 | 11.4 | 28 |
| Comparative Example 2 | Polyvinyl butyral resin SB | 2.1 | 10.7 | 25 |

Example 11

In 9.0 g of methyl ethyl ketone were dissolved 1.2 g of an epoxy resin (Epikote 828, manufactured by Yuka Shell Epoxy K. K.), 0.036 g of 1-(2-cyanoethyl)-2-ethyl-4-methylimidazole, and 1.8 g of modified polyvinyl acetal resin PA1 to obtain resin composition CA1. This composition was applied to a polyimide film (Upilex R, manufactured by Ube Industries, Ltd.) with an applicator having a gap of 10 mils. The coating was air-dried and then dried in a hot-air drying oven at 180° C. for 2 hours to cure the resin. The coating film obtained was subjected to a crosscut cellophane tape peeling test in accordance with JIS K 5400, in which the coating film was crosshatch-wise incised at an interval of 1 mm to make 10×10 squares. The number of remaining squares was counted to judge the adhesiveness of the coating film. The film had a satisfactory appearance. As a result of the cellophane tape peeling test, no squares peeled off.

Example 12

The same experiment as in Example 11 was conducted, except that modified polyvinyl acetal resin PA2 was used in place of PA1 used in Example 11. Thus, resin composition CA2 was obtained. This resin composition was evaluated for adhesiveness. It had a satisfactory appearance. As a result of the cellophane tape peeling test, no squares peeled off.

Example 13

The same experiment as in Example 11 was conducted, except that modified polyvinyl acetal resin PB1 was used in place of PA1 used in Example 11. Thus, resin composition CB1 was obtained. This resin composition was evaluated for adhesiveness. It had a satisfactory appearance. As a result of the cellophane tape peeling test, no squares peeled off.

Example 14

The same experiment as in Example 11 was conducted, except that modified polyvinyl acetal resin PB2 was used in place of PA1 used in Example 11. Thus, resin composition CB2 was obtained. This resin composition was evaluated for adhesiveness. It had a satisfactory appearance. As a result of the cellophane tape peeling test, no squares peeled off.

Example 15

The same experiment as in Example 11 was conducted, except that modified polyvinyl acetal resin PC1 was used in place of PA1 used in Example 11. Thus, resin composition CC1 was obtained. This resin composition was evaluated for adhesiveness. It had a satisfactory appearance. As a result of the cellophane tape peeling test, no squares peeled off.

Example 16

The same experiment as in Example 11 was conducted, except that modified polyvinyl acetal resin PD1 was used in place of PA1 used in Example 11. Thus, resin composition CD1 was obtained. This resin composition was evaluated for adhesiveness. It had a satisfactory appearance. As a result of the cellophane tape peeling test, no squares peeled off.

Example 17

The same experiment as in Example 11 was conducted, except that modified polyvinyl acetal resin PE1 was used in place of PA1 used in Example 11. Thus, resin composition CE1 was obtained. This resin composition was evaluated for adhesiveness. It had a satisfactory appearance. As a result of the cellophane tape peeling test, no squares peeled off.

Comparative Example 4

The same experiment as in Example 11 was conducted, except that SA was used in place of modified polyvinyl acetal resin PA1 used in Example 11. Thus, resin composition CSA was obtained. This resin composition was evaluated for adhesiveness.

In the crosscut cellophane tape peeling test, all the 10×10 squares peeled off.

Comparative Example 5

The same experiment as in Example 11 was conducted, except that polyvinyl butyral resin SB (trade name, S-LEC B BL-S; manufactured by Sekisui Chemical Co., Ltd.) was used in place of modified polyvinyl acetal resin PA1 used in Example 11. Thus, resin composition CSB was obtained. This resin composition was evaluated for adhesiveness.

In the crosscut cellophane tape peeling test, all the 10×10 squares peeled off.

Comparative Example 6

In 9.0 g of methyl ethyl ketone were dissolved 1.2 g of an acrylic resin (BR-80, manufactured by Mitsubishi Rayon Co., Ltd.) and 1.8 g of the above modified polyvinyl acetal resin PB2 to obtain resin composition CB2m. This resin composition was evaluated for adhesiveness.

It had fine unevenness and white turbidity. In the crosscut cellophane tape peeling test, all the 10×10 squares peeled off.

The results obtained in Examples 11 to 17 and Comparative Examples 4 to 6 are shown in Table 4.

The results show that CA1, CA2, CB1, CB2, CC1, CD1, and CE1, which each had carboxylic functional groups, gave resin compositions having better adhesiveness than those obtained from CSA and CSB, which each had no such functional groups. Further, CB2m which is a mixture of a modified polyvinyl acetal resin and an acrylic resin was poor in both appearance and adhesiveness.

TABLE 4

Adhesiveness of mixtures with epoxy

| | Resin composition | Resin | Appearance | Cellophane tape peeling |
|---|---|---|---|---|
| Example 11 | CA1 | PA1 | good | good (no peeling) |
| Example 12 | CA2 | PA2 | good | good (no peeling) |
| Example 13 | CB1 | PB1 | good | good (no peeling) |
| Example 14 | CB2 | PB2 | good | good (no peeling) |
| Example 15 | CC1 | PC1 | good | good (no peeling) |
| Example 16 | CD1 | PD1 | good | good (no peeling) |
| Example 17 | CE1 | PE1 | good | good (no peeling) |
| Comparative Example 4 | CSA | SA | good | N.G. (wholly peeled off) |
| Comparative Example 5 | CSB | SB (polyvinyl) butyral) | good | N.G. (wholly peeled off) |
| Comparative Example 6 | CB2m | PB2 | N.G. | N.G. (wholly peeled off) |

Example 18

In 40 g of methyl ethyl ketone were dissolved 16.0 g of an epoxy resin (Epikote 828, manufactured by Yuka Shell Epoxy K.K.), 0.48 g of 1-(2-cyanoethyl)-2-ethyl-4-methylimidazole, and 4.0 g of modified polyvinyl acetal resin PA1 to obtain resin composition CA1'.

Example 19

The same procedure as in Example 18 was conducted, except that PA2 was used in place of the modified polyvinyl acetal resin. Thus, composition CA2' was obtained.

Example 20

The same procedure as in Example 18 was conducted, except that PB1 was used in place of the modified polyvinyl acetal resin. Thus composition CB1' was obtained.

Example 21

In 32.5 g of methyl ethyl ketone were dissolved 19.0 g of an epoxy resin (Epikote 828, manufactured by Yuka Shell Epoxy K.K.), 0.57 g of 1-(2-cyanoethyl)-2-ethyl-4-methylimidazole, and 1.0 g of modified polyvinyl acetal resin PA1 to obtain resin composition CA1".

Example 22

In 90 g of methyl ethyl ketone were dissolved 12.0 g of an epoxy resin (Epikote 828, manufactured by Yuka Shell Epoxy K.K.), 0.36 g of 1-(2-cyanoethyl)-2-ethyl-4-methylimidazole, and 18.0 g of modified polyvinyl acetal resin PA1 to obtain resin composition CA1"'.

Comparative Example 7

In 24 g of methyl ethyl ketone were dissolved 16.0 g of an epoxy resin (Epikote 828, manufactured by Yuka Shell Epoxy K.K.) and 0.48 g of 1-(2-cyanoethyl)-2-ethyl-4-methylimidazole to obtain resin composition CX.

Comparative Example 8

In 40 g of methyl ethyl ketone were dissolved 16.0 g of an epoxy resin (Epikote 828, manufactured by Yuka Shell Epoxy K. K.), 0.48 g of 1-(2-cyanoethyl)-2-ethyl-4-methylimidazole, and 4.0 g of polyvinyl acetal resin SA to obtain resin composition CSA'.

The makeups of the compositions are shown in Table 5.

TABLE 5

| | Composition obtained | Curable resin | Curing agent | Other additive |
|---|---|---|---|---|
| Example 18 | CA1' | Epikote 828 (16.0) | 2E4MZCN (0.48) | modified polyvinyl acetal resin PA 1 (4.0) |
| Example 19 | CA2' | Epikote 828 (16.0) | 2E4MZCN (0.48) | modified polyvinyl acetal resin PA 2 (4.0) |
| Example 20 | CB1' | Epikote 828 (16.0) | 2E4MZCN (0.48) | modified polyvinyl acetal resin PB 1 (4.0) |
| Example 21 | CA1" | Epikote 828 (19.0) | 2E4MZCN (0.57) | modified polyvinyl acetal resin PA 1 (1.0) |
| Example 22 | CA1"' | Epikote 828 (12.0) | 2E4MZCN (0.36) | modified polyvinyl acetal resin PA 1 (18.0) |
| Comparative Example 7 | CX | Epikote 828 (16.0) | 2E4MZCN (0.48) | none |
| Comparative Example 8 | CSA' | Epikote 828 (16.0) | 2E4MZCN (0.48) | polyvinyl acetal resin SA (4.0) |

Epikote 828 is an epoxy resin manufactured by Yuka Shell Epoxy K. K.

2E4MZCN is 1-(2-cyanoethyl)-2-ethyl-4-methylimidazole. The numeral in each parenthesis indicates the incorporation amount (g).

Examples 23 to 27 and Comparative Examples 9 and 10

Each of the compositions (solutions) obtained in Examples 18 to 22 and Comparative Examples 7 and 8 was applied to a polyimide film (Upilex R, manufactured by Ube Industries, Ltd.) with an applicator having a gap of 10 mils. The coating was air-dried and then heated in a hot-air drying oven at 180° C. for 2 hours to cure the resin. Thus, laminated products were obtained. These laminated products were examined for appearance and subjected to a flexibility test. In the flexibility test, each laminated product was pressed against a 3-φ stainless-steel rod in such a manner that the back side of the laminated product came into contact with the rod, and the cured composition was visually evaluated for any abnormality. The results obtained are shown in Table 6.

Table 6 shows that when a modified polyvinyl acetal resin represented by formula (I') was not used and when polyvinyl acetal resin SA was used in place of a modified polyvinyl acetal resin represented by formula (I'), then the coating film obviously had a poor appearance.

TABLE 6

Results of flexibility test

| | Composition | Appearance (after cure) | Flexibility test |
|---|---|---|---|
| Example 23 | CA1' | good | good |
| Example 24 | CA2' | good | good |
| Example 25 | CB1' | good | good |
| Example 26 | CA1" | good | good |
| Example 27 | CA1'" | good | good |
| Comparative Example 9 | CX | poor (considerable unevenness of thickness) | good |
| Comparative Example 10 | CSA' | poor (substrate surface was exposed) | — |

Examples 28 to 32 and Comparative Examples 11 and 12

Each of the compositions (solutions) obtained in Examples 18 to 22 and Comparative Examples 7 and 8 was applied to an aluminum film with an applicator having a gap of 25 mils. The coating was air-dried and then heated in a hot-air drying oven at 180° C. for 2 hours to cure the resin. Thus, laminated products were obtained. These laminated products were examined for appearance and subjected to a crosscut cellophane tape peeling test. In the crosscut cellophane tape peeling test, the coating side was crosshatch-wise incised with a cutter at an interval of 1 mm to make 10×10 squares, and a cellophane tape was tightly applied to the incised surface and then stripped at a breath. Whether the squares were peeled off or not was visually evaluated. The results obtained are shown in Table 7.

Table 7 shows that when modified polyvinyl acetal resin represented by formula (I') was not used and when polyvinyl acetal resin SA was used in place of a modified polyvinyl acetal resin represented by formula (I'), then the coating layer obviously had poor adhesiveness.

TABLE 7

Results of adhesiveness test

| | Composition | Appearance (after cure) | Adhesiveness in peeling test |
|---|---|---|---|
| Example 28 | CA1' | good | good |
| Example 29 | CA2' | good | good |
| Example 30 | CB1' | good | good |
| Example 31 | CA1" | good | good |
| Example 32 | CA1'" | good | good |
| Comparative Exmaple 11 | CX | good | wholly peeled off |
| Comparative Example 12 | CSA' | good | wholly peeled off |

Example 33

In 24.0 g of methyl ethyl ketone was dissolved 6.0 g of modified polyvinyl acetal resin PC1. This solution was applied to a polyethylene sheet with a 10-mil applicator, and the coating was dried at 60° C. for 0.5 hours. After the coated sheet was allowed to cool, the solution was applied again to the coating film with a 10-mil applicator and dried at 60° C. for 1 hour. Subsequently, this coated sheet was transferred to a vacuum dryer and dried therein at a degree of vacuum of 5 Torr and a temperature of 60° C. for 12 hours. The polyethylene sheet was peeled off to obtain a filmy resin.

This resin was cut into strips having a width of 4 mm, which were analyzed with TMA 120 (manufactured by Seiko Instruments Inc.) under a load of 5 g at a heating rate of 2 ° C. /min to determine the glass transition temperature thereof.

Example 34

The same experiment as in Example 33 was conducted, except that modified polyvinyl acetal resin PA2 was used in place of PC1.

Example 35

The same experiment as in Example 33 was conducted, except that modified polyvinyl acetal resin PD1 was used in place of PC1.

Example 36

The same experiment as in Example 33 was conducted, except that modified polyvinyl acetal resin PE1 was used in place of PC1.

Comparative Example 13

The same experiment as in Example 33 was conducted, except that modified polyvinyl acetal resin PB2 was used in place of PC1.

The results obtained in Examples 33 to 36 and Comparative Example 13 are shown in Table 8.

Table 8 shows that resins PA2, PC1, PD1, and PE1, each corresponding to a>0, had higher glass transition temperatures than resin PB2, corresponding to a=0.

TABLE 8

Glass transition temperatures of modified polyvinyl acetal resins

| | Resin | $T_g$ |
|---|---|---|
| Example 33 | PC1 | 105.4 |
| Example 34 | PA2 | 82.8 |
| Example 35 | PD1 | 122.0 |
| Example 36 | PE1 | 66.5 |
| Comparative Example 13 | PB2 | 63.6 |

Example 3

In 9.0 g of methyl ethyl ketone were dissolved 1.2 g of an epoxy resin (Epikote 828, manufactured by Yuka Shell Epoxy K. K.), 0.036 g of 1-(2-cyanoethyl)-2-ethyl-4-methylimidazole, and 1.8 g of modified polyvinyl acetal resin PB2 to obtain resin composition CA1"". This composition was applied to a Teflon sheet with an applicator having a gap of 10 mils, and the coating was dried at 60° C. for 0.5 hour. After the coated sheet was allowed to cool, the composition was applied again to the coating film with a 10-mil applicator, dried at 60° C. for 0.5 hour, and then heated in a hot-air drying oven at 180° C. for 2 hours to cure the resin.

The Teflon sheet was peeled off, and the filmy resin obtained was examined for dielectric constant and dielectric loss tangent at 10 MHz using an impedance analyzer (HP4291A, manufactured by HEWLETT-PACKARD Co.)

Example 38

The same procedure as in Example 37 was conducted, except that modified polyvinyl acetal resin PA2 was used in place of PB2. Thus, resin composition CA2"" was obtained, which was examined for dielectric constant and dielectric loss tangent at 10 MHz in the same manner as in Example 37.

Example 39

The same procedure as in Example 37 was conducted, except that modified polyvinyl acetal resin PC1 was used in place of PB2. Thus, resin composition CC1"" was obtained, which was examined for dielectric constant and dielectric loss tangent at 10 MHz in the same manner as in Example 37.

Example 40

The same procedure as in Example 37 was conducted, except that modified polyvinyl acetal resin PD1 was used in place of PB2. Thus, resin composition CD1"" was obtained, which was examined for dielectric constant and dielectric loss tangent at 10 MHz in the same manner as in Example 37.

Example 41

The same procedure as in Example 37 was conducted, except that modified polyvinyl acetal resin PE1 was used in place of PB2. Thus, resin composition CE1"" was obtained, which was examined for dielectric constant and dielectric loss tangent at 10 MHz in the same manner as in Example 37.

Comparative Example 14

In 24 g of methyl ethyl ketone were dissolved 16.0 g of an epoxy resin (Epikote 828, manufactured by Yuka Shell Epoxy K.K.) and 0.48 g of 1-(2-cyanoethyl)-2-ethyl-4-methylimidazole to obtain resin composition CX"". This composition was applied to a Teflon sheet with an applicator having a gap of 10 mils, and the coating was dried at 60° C. for 0.5 hour and then heated in a hot-air drying oven at 180° C. for 2 hours to cure the resin.

The Teflon sheet was peeled off, and the filmy resin obtained was examined for dielectric constant and dielectric loss tangent at 10 MHz using an impedance analyzer (HP4291A, manufactured by HEWLETT-PACKARD Co.)

The results obtained in Examples 38 to 41 and Comparative Example 14 are shown in Table 9.

Table 9 shows that the cured compositions obtained from the resin compositions respectively containing modified polyvinyl acetal resins PB2, PA2, PC1, PD1, and PE1, were lower in dielectric constant and/or dielectric loss tangent than the cured composition obtained from the resin composition containing none of these resins.

TABLE 9

Dielectric constants and dielectric loss tangents of epoxy resin containing modified polyvinyl acetal resin

| | Curable resin | Curing agent | Modified polyvinyl acetal resin | ε (10 MHz) | tan δ (×10E-3) |
|---|---|---|---|---|---|
| Example 38 | Epikote 828 (1.2) | 2E4MZCN (0.036) | modified polyvinyl acetal resin PB2 (1.8) | 2.8 | 26.0 |
| Example 39 | Epikote 828 (1.2) | 2E4MZCN (0.036) | modified polyvinyl acetal resin PA2 (1.8) | 2.3 | 20.0 |
| Example 40 | Epikote 828 (1.2) | 2E4MZCN (0.036) | modified polyvinyl acetal resin PC1 (1.8) | 2.6 | 24.5 |
| Example 41 | Epikote 828 (1.2) | 2E4MZCN (0.036) | modified polyvinyl acetal resin PD1 (1.8) | 2.3 | 20.3 |
| Example 42 | Epikote 828 (1.2) | 2E4MZCN (0.036) | modified polyvinyl acetal resin PE1 (1.8) | 2.4 | 19.7 |
| Comparative Example 14 | Epikote 828 (16.0) | 2E4MZCN (0.48) | none | 3.5 | 31.7 |

Epikote 828 is an epoxy resin manufactured by Yuka Shell Epoxy K. K.

2E4MZCN is 1-(2-cyanoethyl)-2-ethyl-4-methylimidazole. The numeral in each parenthesis indicates the incorporation amount (g).

As described above in detail, the modified polyvinyl acetal resin having a specific structure of the invention has a low dielectric constant and a small dielectric loss tangent and is excellent in compatibility with resins and adhesiveness to substrates.

Consequently, the resin of the invention is useful in applications where electrical insulating properties and mechanical properties are especially required, such as, e.g., substrates for printed circuit boards and parts for computers. Substrates, electronic parts, and the like each having excellent performances are obtained with the resin.

By using the modified polyvinyl acetal resin having a specific structure according to the invention, the film-forming ability of a curable resin is improved significantly and a resin composition is obtained which gives a laminated product excellent in adhesiveness to the substrate and in flexibility.

Furthermore, by using the modified polyvinyl acetal resin having a specific structure according to the invention, the film-forming ability of a curable resin is improved significantly and a laminated product excellent in adhesiveness to the substrate and in flexibility can be obtained.

While the invention has been described in detail and with reference to specific embodiments thereof, it will be apparent to one skilled in the art that various changes and modifications can be made therein without departing from the spirit and scope thereof.

What is claimed is:

1. A curable resin composition comprising a curable resin (A) and a curing agent (B), said composition containing a modified polyvinyl acetal resin (C) consisting essentially of repeating units represented by the following formula (I'):

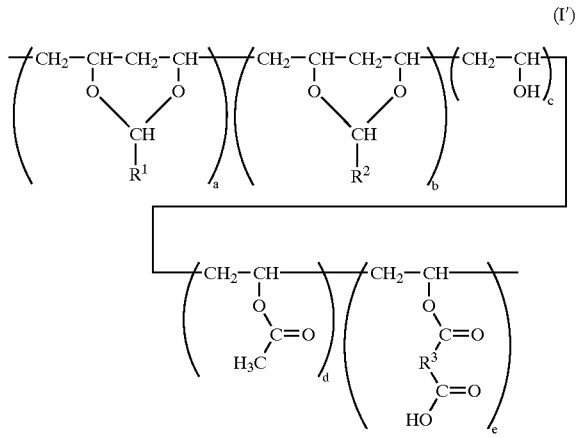

wherein R¹ represents an optionally substituted aryl group, an optionally substituted aralkyl group, or an optionally substituted alkenyl group having an optionally substituted aryl group; R² represents a hydrogen atom or an alkyl group having 1 to 10 carbon atoms; R³ represents an optionally substituted, bivalent hydrocarbon group having 1 to 20 carbon atoms; and a, b, c, d, and e indicate the proportions in mol % of the respective structural units in the formula and satisfy $0 \leq a \leq 85$, $0 \leq b \leq 80$, $0 \leq c \leq 50$, $0 \leq d \leq 30$, $0 < e \leq 50$, and $a+b \neq 0$.

2. The curable resin composition of claim 1, wherein with respect to the repeating units in the modified polyvinyl acetal resin, $0 < a \leq 85$.

3. The curable resin composition of claim 1, wherein ingredient (A) is an epoxy resin, and with respect to the repeating units in-ingredient (C), a=0.

4. The curable resin composition of claim 1, wherein a+b is from 30 to 80 mol %.

5. The curable resin composition of claim 1, wherein the modified polyvinyl acetal resin is a resin obtained by acetalizing a polyvinyl alcohol with an aldehyde and then modifying the resultant acetalization product with an acid anhydride.

6. The curable resin composition of claim 5, wherein the polyvinyl alcohol used as a starting material has a degree of polymerization of from 30 to 3,000.

7. A cured composition obtained by curing the curable resin composition of claim 1.

8. A laminated product comprising a layer of the curable resin composition of claim 1 and a substrate layer.

9. A laminated product comprising a layer of the cured composition of claim 7 and a substrate layer.

* * * * *